(12) United States Patent
Tai

(10) Patent No.: US 10,635,850 B2
(45) Date of Patent: Apr. 28, 2020

(54) CIRCUIT DESIGN METHOD AND ASSOCIATED COMPUTER PROGRAM PRODUCT

(71) Applicant: Silicon Motion Inc., Hsinchu County (TW)

(72) Inventor: Shih-Hsiang Tai, Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 4 days.

(21) Appl. No.: 16/049,803

(22) Filed: Jul. 30, 2018

(65) Prior Publication Data

US 2019/0205497 A1 Jul. 4, 2019

(30) Foreign Application Priority Data

Jan. 2, 2018 (TW) .............................. 107100019 A

(51) Int. Cl.
| | |
|---|---|
| *G06F 30/394* | (2020.01) |
| *G06F 30/34* | (2020.01) |
| *G06F 30/392* | (2020.01) |
| *G06F 30/3312* | (2020.01) |
| G06F 3/0484 | (2013.01) |
| G06F 111/04 | (2020.01) |
| G06F 119/12 | (2020.01) |

(52) U.S. Cl.
CPC ........ *G06F 30/394* (2020.01); *G06F 30/3312* (2020.01); *G06F 30/34* (2020.01); *G06F 30/392* (2020.01); *G06F 3/0484* (2013.01); *G06F 2111/04* (2020.01); *G06F 2119/12* (2020.01)

(58) Field of Classification Search
CPC ............... G06F 17/5077; G06F 3/0484; G06F 2217/06; G06F 2217/84
USPC .......................................................... 716/113
See application file for complete search history.

(56) References Cited

U.S. PATENT DOCUMENTS

2013/0298097 A1* 11/2013 Chang ................. G06F 17/5031
716/113
2018/0314771 A1* 11/2018 Lee ...................... G06F 17/5031

FOREIGN PATENT DOCUMENTS

| CN | 106462553 A | 2/2017 |
|---|---|---|
| TW | I220268 | 8/2004 |
| TW | I459227 B | 11/2014 |

* cited by examiner

*Primary Examiner* — Suresh Memula
(74) *Attorney, Agent, or Firm* — Winston Hsu

(57) ABSTRACT

The present invention provides a circuit design method, wherein the circuit design comprises the steps of: designing a plurality of paths, wherein each path comprises a plurality of elements; determining if the paths have enough timing margin to determine at least one specific path; and replacing at least one specific element within the specific path by a configurable gate array cell, wherein a function of the configurable gate array cell is the same as a function of the specific element.

12 Claims, 7 Drawing Sheets

CIRCUIT DESIGN METHOD AND ASSOCIATED COMPUTER PROGRAM PRODUCT

BACKGROUND OF THE INVENTION

1. Field of the Invention

The present invention relates to circuit design, and more particularly, to a circuit design method for engineering change order (ECO).

2. Description of the Prior Art

In the conventional circuit design, since an ECO might be received after completion of the chip layout and after the completion of the mask manufacturing to request changing the function of some elements, some standard spare elements (such as logic gates, flip-flops, buffers, etc.) are usually placed in the remaining space of the chip during the circuit design stage, so that these standard spare elements can be utilized to change the circuit function by changing the connection line after receiving the ECO. For example, assuming that an inverter in a circuit path needs to be replaced with a buffer, an engineer can connect the input terminal and the output terminal of the flip-flop to the input terminal and the output terminal of a buffer originally utilized as a spare element. In order to achieve the functional replacement of elements, and these design changes only need to change to some of the metal mask. However, since these standard spare elements are not necessarily located in the vicinity of the circuit path that needs to be changed, it can cause a large increase in the signal transmission path due to the circuit path needs to be connected to a standard spare element, which can cause timing violation.

SUMMARY OF THE INVENTION

It is therefore one of the objectives of the present invention to provide a circuit design, which can actively replace some of the elements in the circuit path with configurable gate array cells having the same function, to solve the above-mentioned problem due of the engineering change order (ECO).

According to a first aspect of the present invention, an exemplary circuit design method is disclosed. The circuit design method comprises: designing a plurality of paths, wherein each path includes a plurality of elements; respectively determining whether the paths have a timing margin in signal transmission, and determining at least one specific path having the timing margin; and replacing at least one specific element within the specific path by a configurable gate array cell, wherein a function of the configurable gate array cell is the same as a function of the specific element.

According to a second aspect of the present invention, an exemplary computer program product is disclosed, which executes the program via a computer to perform the following the steps: displaying a user interface on a screen of the computer, wherein the user interface comprises a plurality of circuit design images, a timing analysis image, and a configurable logic gate array cell replacement image; after receiving a command of a user through the circuit design images of the user interface, displaying a plurality of paths designed by the user on the user interface, wherein each path comprises a plurality of circuit elements; after receiving the command of the user through the timing analysis image of the user interface, respectively determining whether the paths have a timing margin in signal transmission, and determining at least one specific path having the timing margin; and after receiving the command of the user through the configurable logic gate array cell replacement image of the user interface, replacing at least one specific element within the specific path by a configurable gate array cell, wherein a function of the configurable gate array cell is the same as a function of the specific element.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
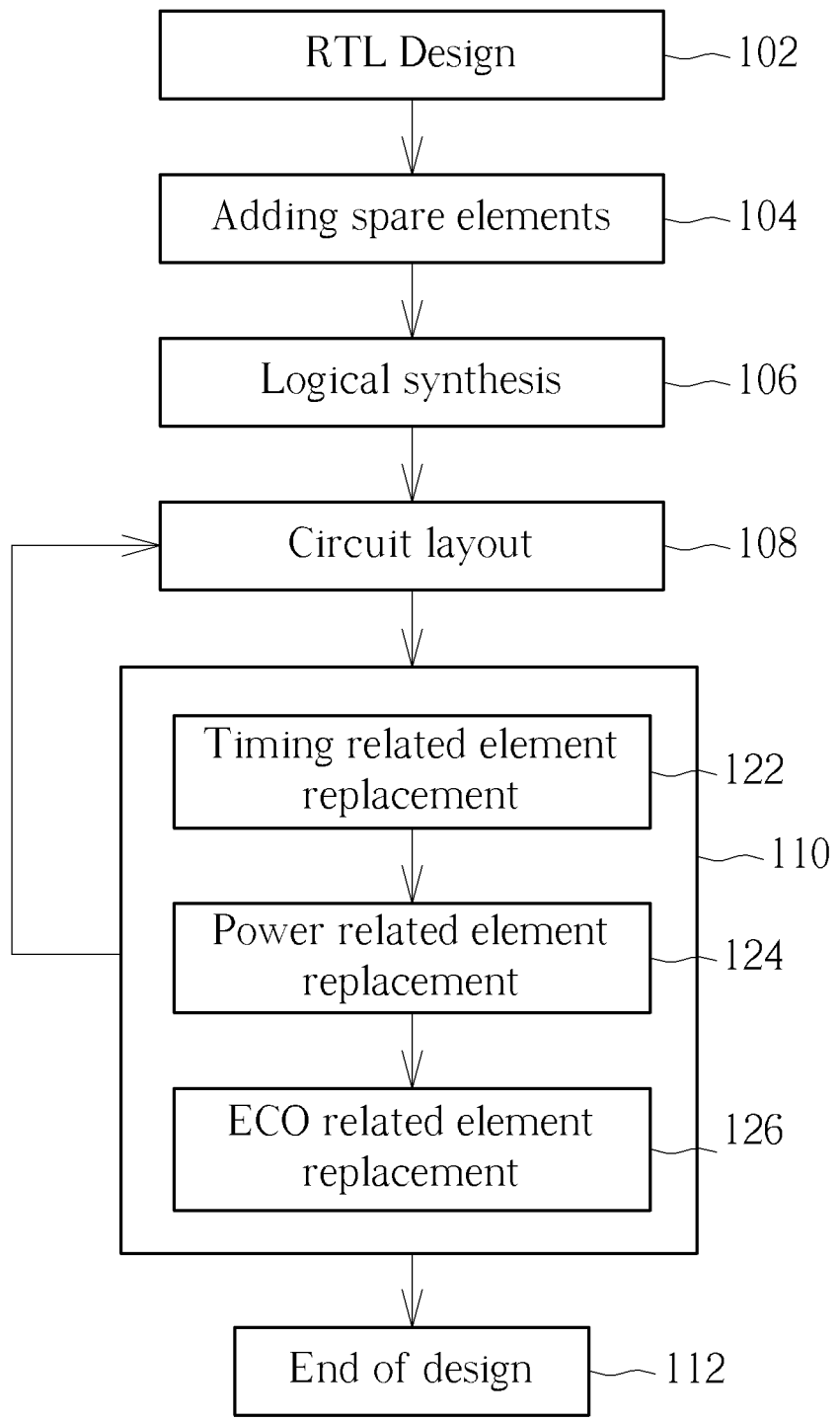
FIG. 1 is a flow chart of a circuit design method according to an embodiment of the present invention.

Please refer to FIG. 1. FIG. 1 is a flow chart of a circuit design method according to an embodiment of the present invention. Referring to FIG. 1, the flow of the circuit design method is described below. Firstly, in the step 102, the user performs a circuit design by using a register transfer level (RTL) language, wherein the circuit design can comprise multiple paths, and each path comprises multiple circuit elements. In the step 104, the user provides a plurality of spare elements around the paths, wherein the spare elements can be standard spare elements, such as logic gates, flip-flops, buffers, etc. In the step 106, the circuit design of the register transfer stage begins synthesis with a plurality of constraints, wherein the constraints can be setting parameters input by engineers, such as clock frequency, pin function, etc. In the step 108, the logically synthesized circuit becomes physical circuit design through the circuit automatic lay out (i.e. the placement and routing of circuit elements). After completing the physical circuit design, element replacement in the circuit design is performed in the step 110. Specifically, the step 110 can further comprise three the steps 122, 124, 126, wherein the step 122 is utilized to perform timing related element replacement, that is, the use of some higher speed elements to replace the elements on the timing violation path is at the expense of a larger chip area and requirement of higher power consumption. The step 124 is utilized to perform power related element replacement, that is, the use of smaller leakage current elements or lower speed elements to replace the elements in the original path with the timing margin to reduce the leakage current without affecting the timing. The step 126 is utilized to perform the element replacement related to the engineering change order (ECO) so as to use configurable gate array cells to replace some of the elements in the multiple paths without affecting the circuit, so that subsequent design changes can be completed quickly and smoothly if an ECO is received. Finally, after the steps 108 and 110 are completed, the flow proceeds to the step 112 to end the circuit design, and the associated physical circuit design can directly perform subsequent mask fabrication.

Since the present invention focuses on the element replacement related to the ECO in the step 126, the following embodiment description uses the step 126 as an illustration, and the related content of the remaining the steps is not described herein.

Figure 2:
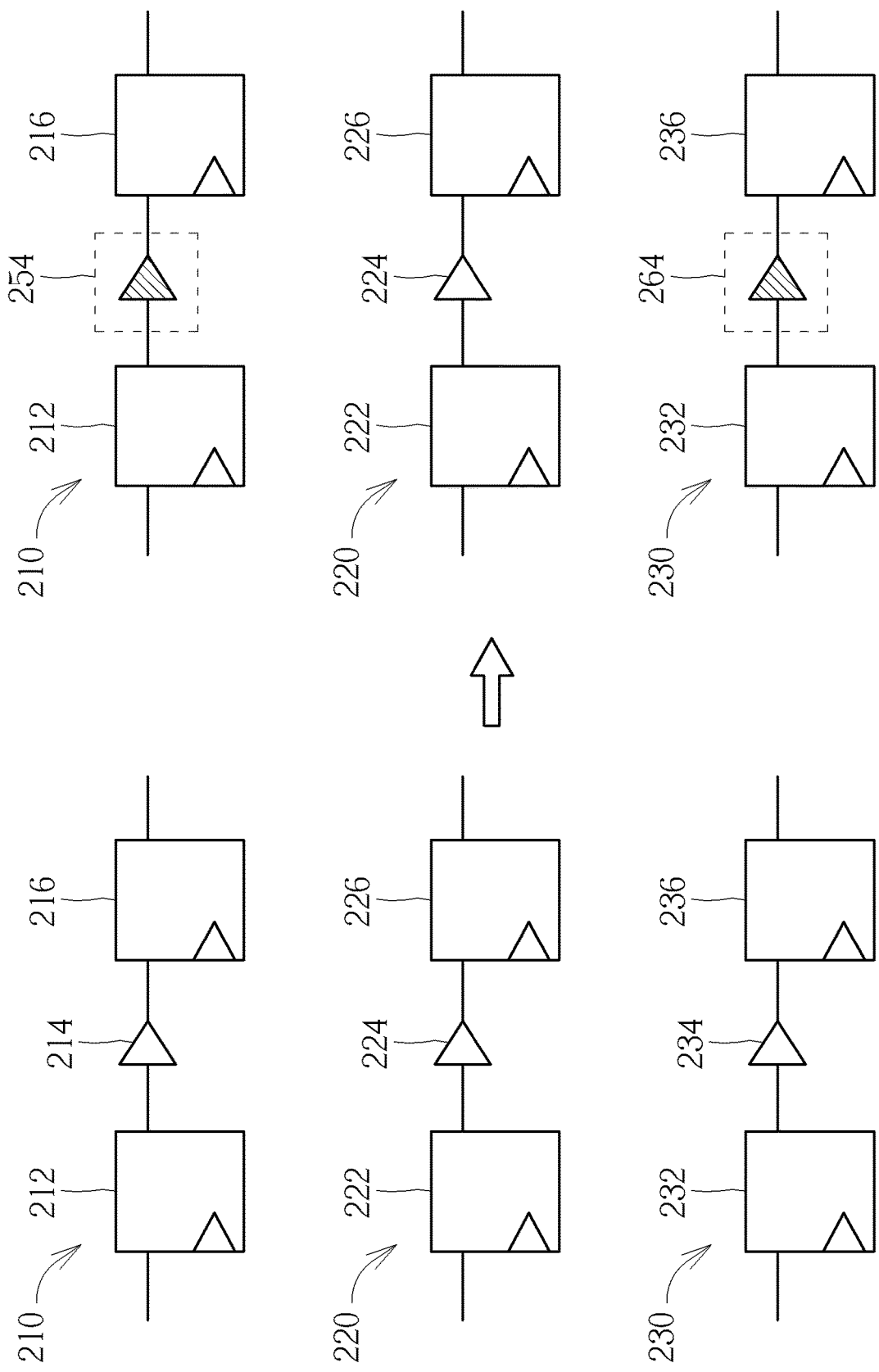
FIG. 2 is a schematic diagram of a circuit design according to an embodiment of the present invention.

FIG. 2 is a schematic diagram of a circuit design according to an embodiment of the present invention. As shown in FIG. 2, in an initial design, for example, the steps 102 to 106 shown in FIG. 1, the circuit comprises three paths 210, 220, and 230. The path 210 comprises two flip-flops 212, 216, and a buffer 214. The path 220 comprises two flip-flops 222, 226, and a buffer 224, and the path 230 comprises two flip-flops 232, 236, and a buffer 234. Next, in the step 126, the paths 210, 230 are found to have a timing margin after the timing analysis. Therefore, in this embodiment, the buffer 214 in the path 210 and the buffer 234 in the path 230 can be replaced by the configurable logic gate array cells 254, 264, respectively, and the configurable logic gate array cells 254, 264 are set to have the function of a buffer.

In this embodiment, the configurable logic gate array cells 254, 264 can determine their functions through the design of one or a few metal layers. Specifically, in the first metal layer design, the configurable logic gate array 254, 264 can have the function of a buffer. In the second metal layer design, the configurable logic gate array cells 254, 264 can have the function of an inverter . . . and so on. Since the configurable logic gate array cell has many kinds of implementation manners, and the actual circuit structure thereof is well known to those skilled in the art, the relevant details are not described herein.

In addition, in general, since the configurable logic gate array cells 254, 264 can support multiple element functions, the configurable logic gate array cells 254, 264 require larger chip area than the original buffers 214, 234, and might also affect the timing of the paths 210, 230. Therefore, in the process of replacing the configurable logic gate array cell, it is necessary to consider the influence on the chip area and the timing. In this embodiment, it is assumed that the increase amplitude of the chip area is within the allowable range (i.e., the increase amplitude of the chip area is within a limit range). The paths 210, 230 are determined to have a timing margin, and the path 220 is determined to be insufficient in timing margin, so only the buffers 214, 234 in the paths 210, 230 are replaced by the configurable logic gate array cells 254, 264, while the buffer 224 in the path 220 maintains the original design.

In one embodiment, the method for determining whether the paths 210, 220, 230 have the timing margin can be as follows: for each path of the paths 210, 220, 230, determining whether a timing violation will occur if a specific element (for example, the buffers 214, 224, 234) in the path (210, 220, or 230) is replaced with the configurable logic gate array cell to determine whether the path (210, 220, or 230) has the timing margin.

Figure 3:
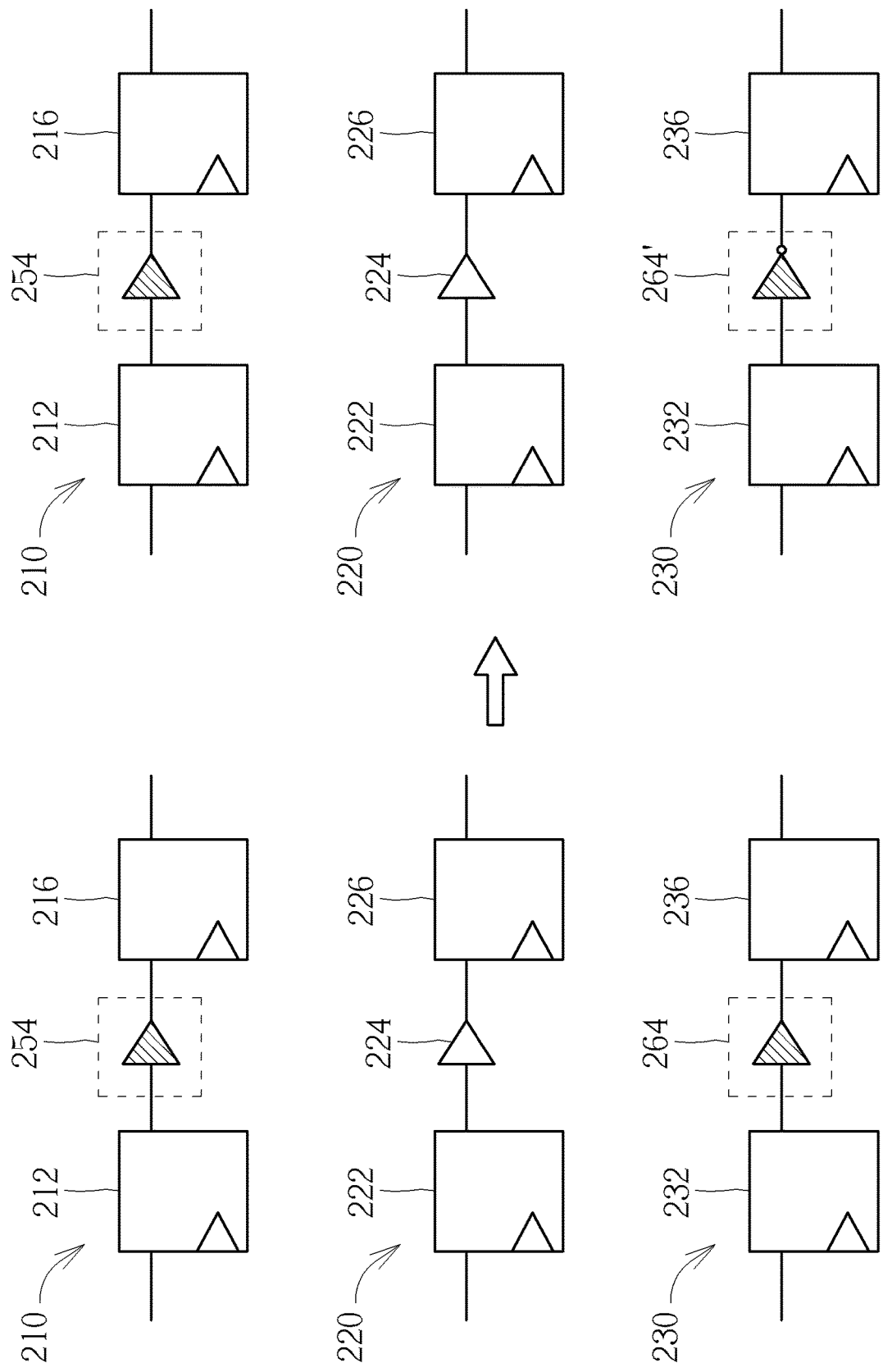
FIG. 3 is a schematic diagram of performing a function change on the elements in the path shown in FIG. 2 after receiving the ECO according to an embodiment of the present invention.

Next, please refer to FIG. 3. FIG. 3 is a schematic diagram of performing a function change on the elements in the path 230 after receiving the ECO according to an embodiment of the present invention. As shown in FIG. 3, it is assumed that an ECO is received after the chip is tapped out to require to replace a buffer in the path 230 (a configurable logic gate array cell 264 with a buffer function) by an inverter, then the engineer can directly change the configurable logic gate array cell 264 with a buffer function to a configurable logic gate array cell 264' with an inverter function by changing the design of a metal layer or a few metal layers. As described above, since only one metal layer or a few metal layers need to be changed to achieve the purpose of changing the function, the cost of the mask can be saved, and it is also possible to avoid the requirement of connecting to another spare element in the prior art which increases the signal transmission path. Thus, the risk of the timing violation due to the ECO can be reduced.

Figure 4:
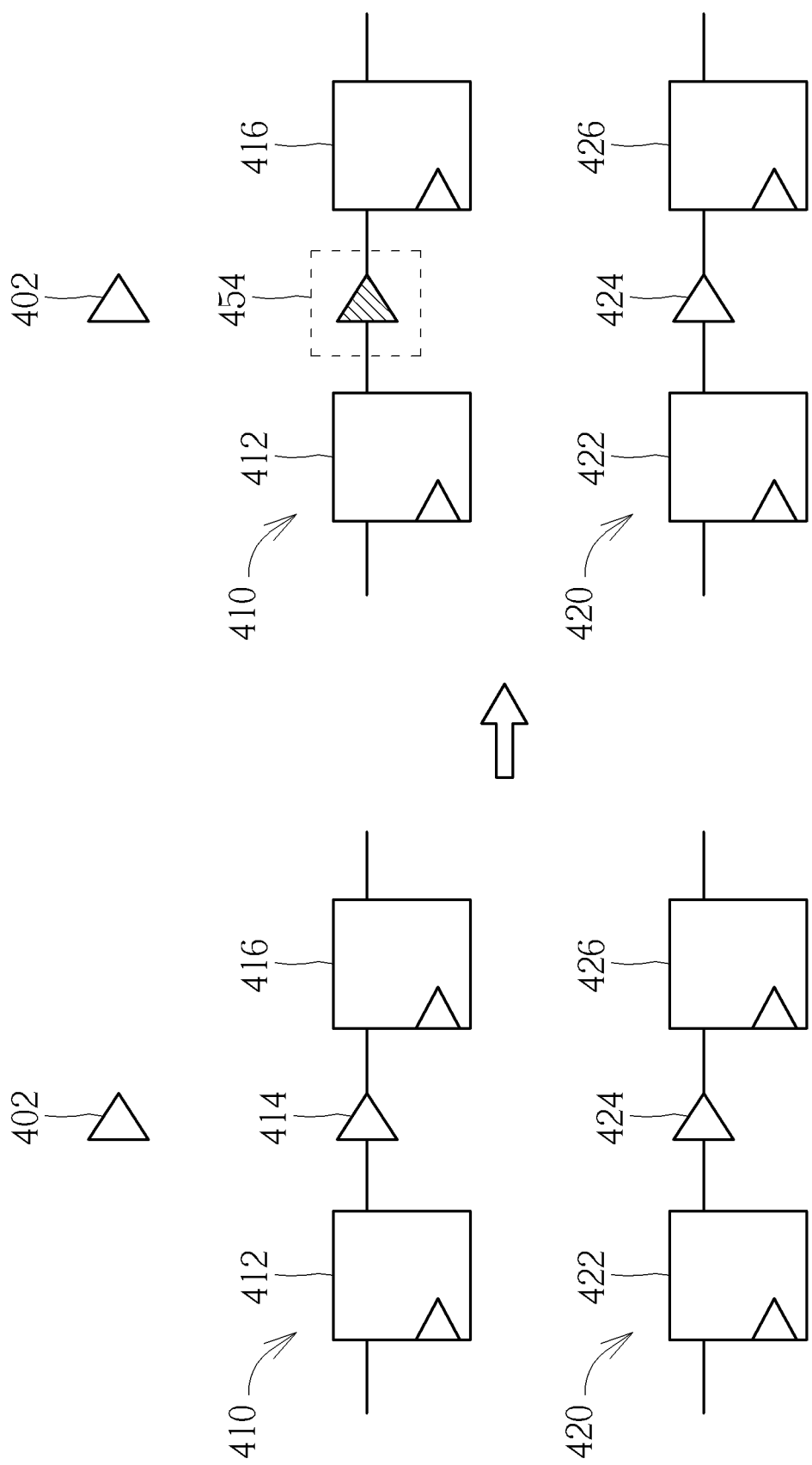
FIG. 4 is a schematic diagram of a circuit design according to another embodiment of the present invention.

FIG. 4 is a schematic diagram of a circuit design according to another embodiment of the present invention. As shown in FIG. 4, in an initial design, for example, the steps 102 to 106 shown in FIG. 1, the circuit comprises a spare buffer 402 and two paths 410 and 420, wherein the path 410 comprises two flip-flops 412, 416, and a buffer 414, and the path 420 comprises two flip-flops 422, 426, and a buffer 424, and the input terminal and the output terminal of the spare buffer 402 are not connected to any other elements. In addition, it is assumed in this embodiment that the path 410 is close to the path 420, and a buffer 424 is close to the buffer 414 in the path 410. Next, in the step 126, the path 410 is found to have a timing margin after the timing analysis. Therefore, this embodiment replaces the buffer 414 in the path 410 with a configurable logic gate array cell 454, and the configurable logic gate array cell 454 is provided with a function of a buffer.

Figure 5:
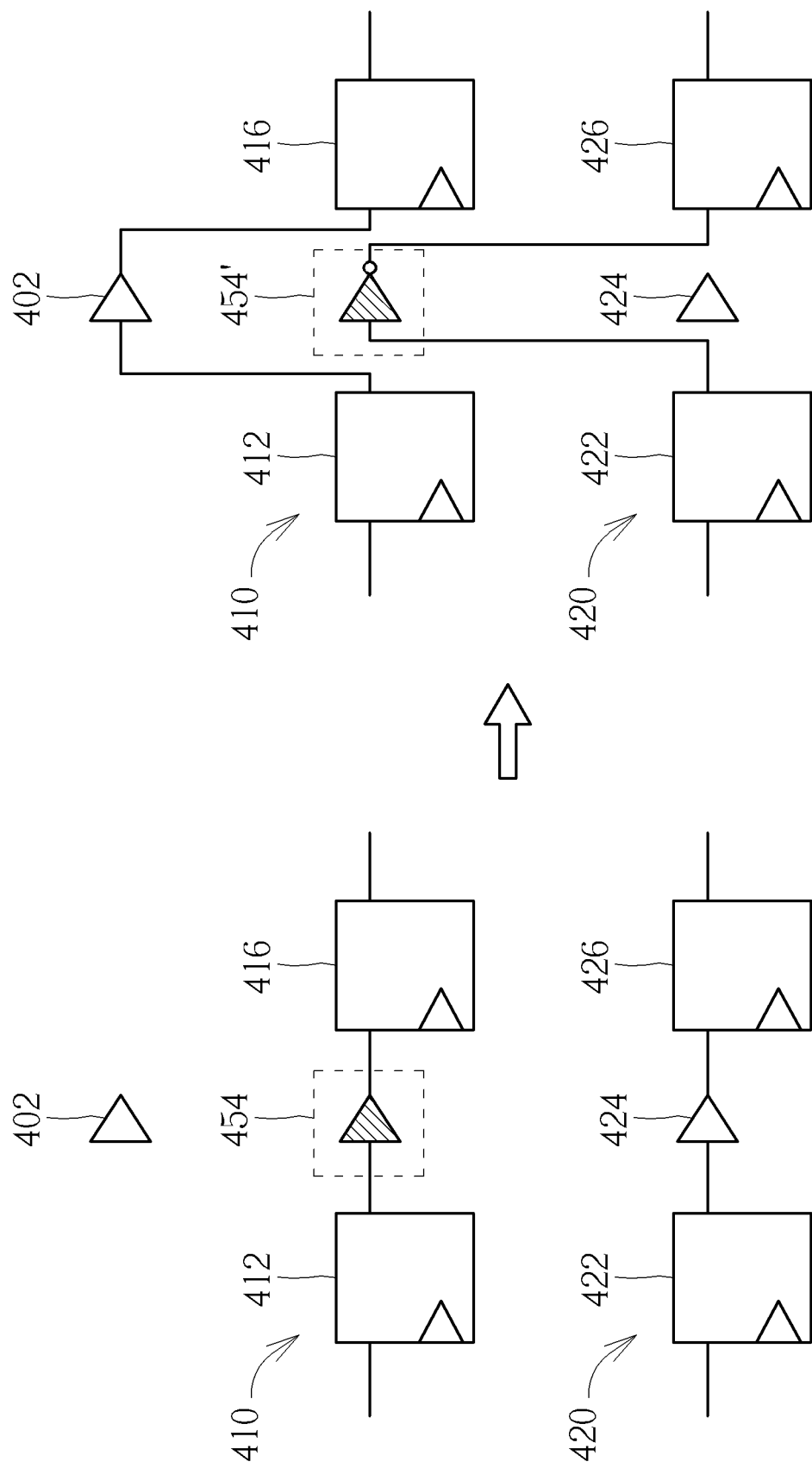
FIG. 5 is a schematic diagram of performing a function change on the elements in the path after receiving the ECO according to an embodiment of the present invention.

Next, please refer to FIG. 5. FIG. 5 is a schematic diagram of performing a function change on the elements in the path 410 after receiving the ECO according to an embodiment of the present invention. As shown in FIG. 5, it is assumed that an ECO is received after the chip goes tape out to request replacing the buffer 424 in the path 420 with an inverter. Since the path 420 does not have a standby inverter around it, in this embodiment the engineer can change the design of the configurable logic gate array cell 454 having a buffer function in the path 410 to a configurable logic gate array cell 454' having an inverter function by changing the design of a metal layer or a few metal layers, and then the input and output terminals of the configurable logic gate array cell 454' having the inverter function are respectively connected to the output terminal of the flip-flop 422 and the input terminal of the flip-flop 426 by changing the design of a metal layer or a few metal layers. That is, the modified path 420 comprises a flip-flop 422, a configurable logic gate array cell 454' having an inverter function, and a flip-flop 426. On the other hand, since the configurable logic gate array cell 454 with the buffer function in the original path 410 has already been utilized by the path 420, the engineer can also change the design of a metal layer or a few metal layers to make the output terminal of the flip-flop 422 connected to the input terminal of the spare buffer 402, and the input terminal of the flip-flop 426 connected to the output terminal of the spare buffer 402. That is, the modified path 410 comprises the flip-flop 412, the spare buffer 402, and the flip-flop 416. As described above, since only one metal layer or a few metal layers need to be changed to achieve the purpose of changing the function, and the length of the paths 410 and 420 after the change will not increase too much, so that the cost of the mask can be saved, and it is also possible to avoid the requirement of connecting to another spare element in the prior art which increases the signal transmission path. Thus, the risk of the timing violation due to the ECO can be reduced.

Figure 6:
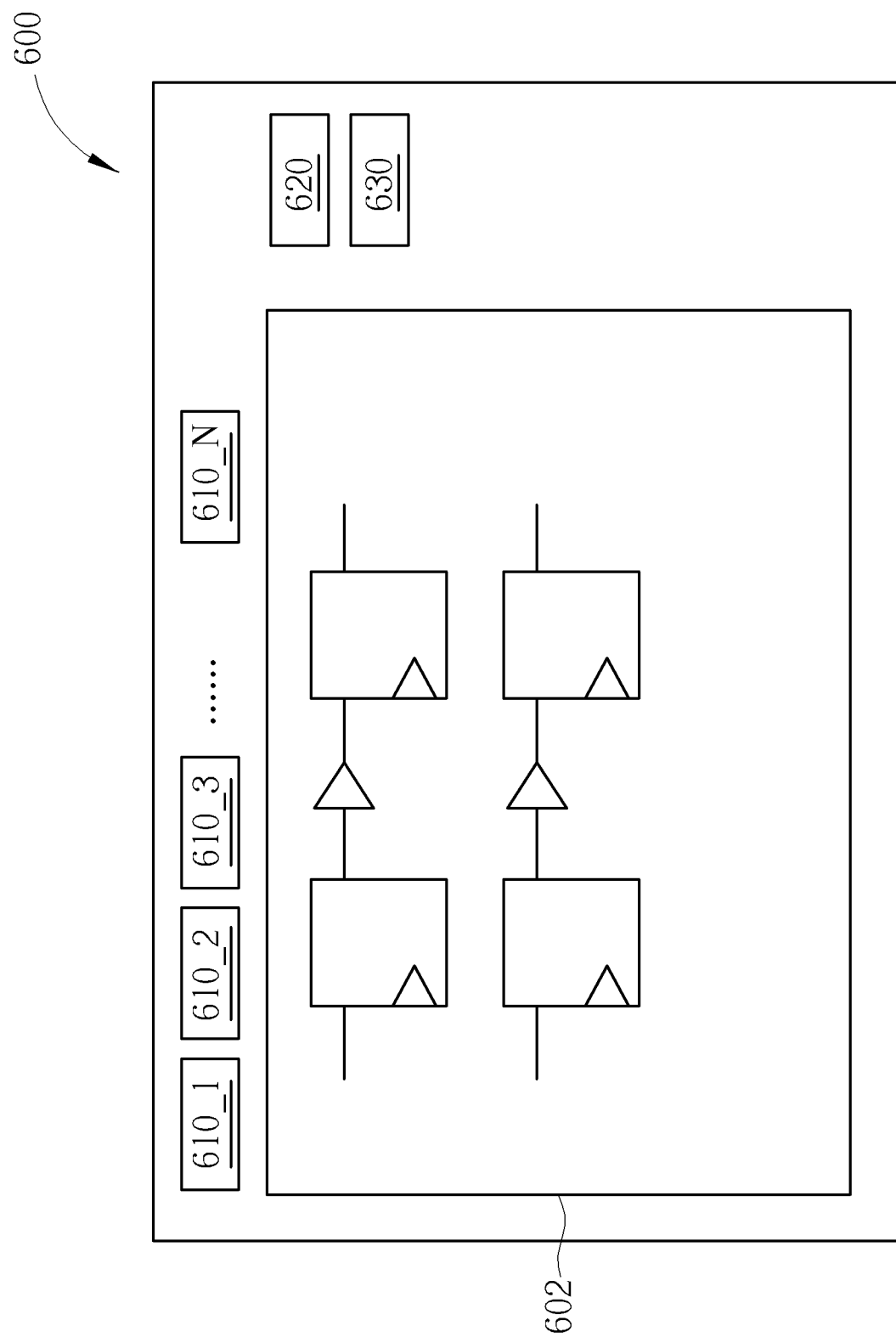
FIG. 6 shows a schematic diagram of a user interface displayed on the screen of the computer according to an embodiment of the present invention.

The circuit design of the present invention is executed after a computer program product is loaded by a computer/processor and executed using a plurality of program commands, and FIG. 6 shows a schematic diagram of a user interface 600 displayed on the screen of the computer according to an embodiment of the present invention. As shown in FIG. 6, the user interface 600 comprises a circuit display area 602, a plurality of circuit design images 601_1~610_N, a timing analysis image 620, and a configurable logic gate array cell replacement image 630. In the use of the user interface 600, the user can perform circuit design by loading or clicking on a plurality of circuit design images 601_1~610_N through the file, and the designed circuit architecture is displayed in the circuit display area 602. Then, after completing the circuit design, the user can click on the timing analysis image 620 to automatically perform timing analysis on each path in the circuit, and in particular, the computer program product will calculate a path with a timing margin and record it. Then, the user can click again on the configurable logic gate array cell replacement image 630 to directly replace some of the elements in the path with the timing margin with the configurable logic gate array cell with the same function settings, for example, as shown in the embodiments of FIG. 2 and FIG. 4, and the circuit design is completed and the subsequent tape out is performed. Then, if an ECO is later received to request partial change of the function, the user can change the functions of a portion of the configurable logic gate array cells again through the plurality of circuit design images 601_1~610_N and/or part of the element connections, as shown in the embodiments of FIG. 3 and FIG. 5, to complete the design changes required by the ECOs.

Figure 7:
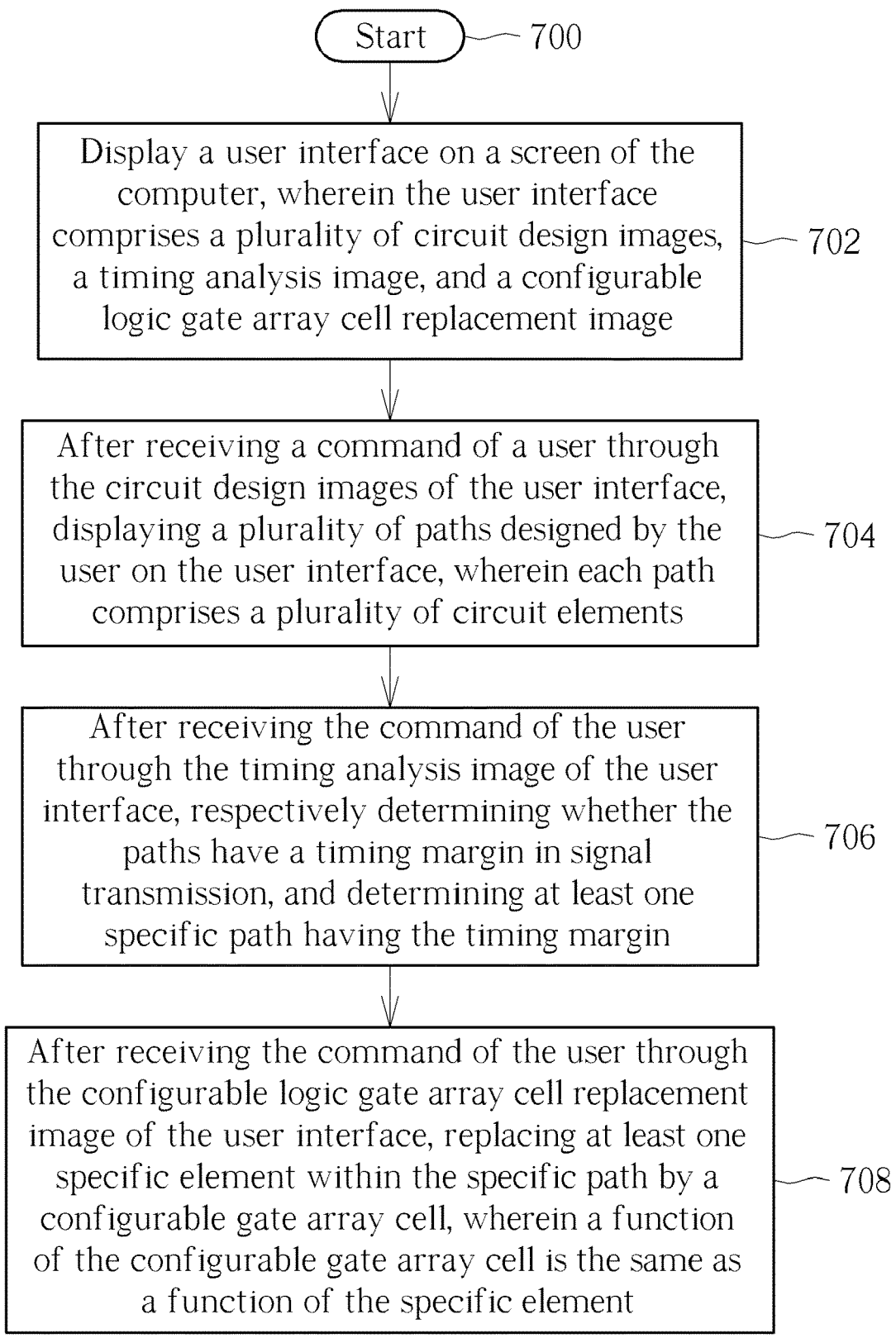
FIG. 7 is a flow chart of operations of a computer program product according to an embodiment of the present invention.

FIG. 7 is a flow chart of operations of a computer program product according to an embodiment of the present invention. With reference to the contents described in the embodiments of FIGS. 1-6 above, the flow chart of FIG. 7 is described as follows:

The step 700: The process starts.

The step 702: Display a user interface on a screen of the computer, wherein the user interface comprises a plurality of circuit design images, a timing analysis image, and a configurable logic gate array cell replacement image The step 704: After receiving a command of a user through the circuit design images of the user interface, displaying a plurality of paths designed by the user on the user interface, wherein each path comprises a plurality of circuit elements.

The step 706: After receiving the command of the user through the timing analysis image of the user interface, respectively determining whether the paths have a timing margin in signal transmission, and determining at least one specific path having the timing margin.

The step 708: After receiving the command of the user through the configurable logic gate array cell replacement image of the user interface, replacing at least one specific element within the specific path by a configurable gate array cell, wherein a function of the configurable gate array cell is the same as a function of the specific element.

Briefly summarized, the circuit design of the present invention replaces elements on the path having timing margin with configurable logic gate array cells when the chip area allows, so as to increase the proportion of the configurable logic gate array cells in the circuit design. With the contents of the embodiments of the present invention, it is possible to complete the change of design simply by adding the least cost if there is a need for subsequent engineering change.

Those skilled in the art will readily observe that numerous modifications and alterations of the device and method can be made while retaining the teachings of the invention. Accordingly, the above disclosure should be construed as limited only by the metes and bounds of the appended claims.

What is claimed is:

1. A circuit design method, comprising:
designing a plurality of paths, wherein each path comprises a plurality of elements;
respectively determining whether the paths have a timing margin in signal transmission, and determining at least one specific path having the timing margin, comprising:
for each path, determining whether a timing violation will occur if a specific element in the path is replaced with a configurable logic gate array cell to determine whether the path has the timing margin; and
determining whether a chip area meets a constraint condition to determine the at least one specific path; and
replacing at least one specific element within the specific path by the configurable gate array cell, wherein a function of the configurable gate array cell is the same as a function of the specific element.

2. The circuit design method of claim 1, wherein the step of respectively determining whether the paths have the timing margin in signal transmission and whether the chip area meets the constraint condition to determine the at least one specific path comprises:
for each path, determining whether a timing violation will occur if a specific element in the path is replaced with the configurable logic gate array cell to determine whether the path has the timing margin;
for each path, determining whether the chip area exceeds the constraint condition if a specific element in the path is replaced with the configurable logic gate array cell to determine whether the path has the timing margin; and
determining a path having the timing margin and the chip area meets the constraint condition as the at least one specific path.

3. The circuit design method of claim 1, further comprising:
when receiving an engineering change order (ECO) to request the specific element in the specific path replaced by an element having another function, changing a connection mode of a metal layer to make the configurable logic gate array cell have another function.

4. The circuit design method of claim 1, further comprising:
providing a spare element, wherein the spare element is not connected to the paths in a preset state; and
when receiving an engineering change order (ECO) to request the specific element in the specific path to be replaced by an element having another function, changing a connection mode of a metal layer to make the configurable logic gate array cell have another function, and connecting the configurable logic gate array cell to the specific path to replace the specific element, and connecting the spare element to the specific path to replace the configurable logic gate array cell.

5. The circuit design method of claim 4, wherein a distance between the spare element and the first element is greater than a distance between the spare element and the specific element.

6. The circuit design method of claim 4, wherein the step of replacing the at least one specific element in the specific path with the configurable logic gate array cell is performed after a circuit layout phase in the circuit design.

7. A computer program product on a non-transitory computer-readable medium, the computer program product executed via the non-transitory computer-readable medium to perform the following steps:

displaying a user interface on a screen of the computer, wherein the user interface comprises a plurality of circuit design images, a timing analysis image, and a configurable logic gate array cell replacement image;

after receiving a command of a user through the circuit design images of the user interface, displaying a plurality of paths designed by the user on the user interface, wherein each path comprises a plurality of circuit elements;

after receiving the command of the user through the timing analysis image of the user interface, respectively determining whether the paths have a timing margin in signal transmission, and determining at least one specific path having the timing margin, comprising:

for each path, determining whether a timing violation will occur if a specific element in the path is replaced with the configurable logic gate array cell to determine whether the path has the timing margin; and determining whether a chip area meets a constraint condition to determine the at least one specific path; and after receiving the command of the user through the configurable logic gate array cell replacement image of the user interface, replacing at least one specific element within the specific path by a configurable gate array cell, wherein a function of the configurable gate array cell is the same as a function of the specific element.

8. The computer program product of claim 7, wherein the step of respectively determining whether the paths have the timing margin in signal transmission and whether the chip area meets the constraint condition to determine the at least one specific path comprises:

for each path, determining whether a timing violation will occur if a specific element in the path is replaced with the configurable logic gate array cell to determine whether the path has the timing margin;

for each path, determining whether the chip area exceeds the constraint condition if a specific element in the path is replaced with the configurable logic gate array cell to determine whether the path has the timing margin; and determining a path having the timing margin and the chip area meets the constraint condition as the at least one specific path.

9. If the computer program product of claim 7, further comprising:

when receiving an engineering change order (ECO) to request the specific element in the specific path replaced by an element having another function, changing a connection mode of a metal layer to make the configurable logic gate array cell have another function.

10. The computer program product of claim 7, further comprising:

providing a spare element, wherein the spare element is not connected to the paths in a preset state; and when receiving an engineering change order (ECO) to request the specific element in the specific path to be replaced by an element having another function, changing a connection mode of a metal layer to make the configurable logic gate array cell have another function, and connecting the configurable logic gate array cell to the specific path to replace the specific element, and connecting the spare element to the specific path to replace the configurable logic gate array cell.

11. The computer program product of claim 10, wherein a distance between the spare element and the first element is greater than a distance between the spare element and the specific element.

12. The computer program product of claim 10, wherein the step of replacing the at least one specific element in the specific path with the configurable logic gate array cell is performed after a circuit layout phase in the circuit design.

* * * * *